United States Patent [19]

Pielkenrood

[11] 4,253,965

[45] Mar. 3, 1981

[54] PURIFICATION DEVICE

[75] Inventor: Jacob Pielkenrood, Krommenie, Netherlands

[73] Assignee: Pielkenrood-Vinitex B.V., Assendelft, Netherlands

[21] Appl. No.: 617,735

[22] Filed: Sep. 29, 1975

[30] Foreign Application Priority Data

Oct. 10, 1974 [NL] Netherlands ............... 7413316
Sep. 2, 1975 [NL] Netherlands ............... 7510357

[51] Int. Cl.³ .......................................... B01D 21/02
[52] U.S. Cl. ...................................... 210/519; 210/521
[58] Field of Search ............ 210/519, 521–523, 210/525, 527; 261/DIG. 44

[56] References Cited

U.S. PATENT DOCUMENTS

| | | | |
|---|---|---|---|
| 1,073,146 | 9/1913 | Korner | 210/519 |
| 1,493,861 | 5/1924 | Kusch | 210/519 |
| 2,304,248 | 12/1942 | Entwistle et al. | 210/519 |
| 2,369,194 | 2/1945 | Weber | 210/519 |
| 2,635,104 | 4/1953 | Chayen | 210/523 X |
| 3,221,889 | 12/1965 | Hirsch | 210/519 X |
| 3,300,053 | 1/1967 | Peters | 210/519 |
| 3,346,122 | 10/1967 | Cornelissen | 210/522 |
| 3,353,679 | 11/1967 | Hirsch | 210/519 X |
| 3,419,145 | 12/1968 | De Celis | 210/519 X |
| 3,473,665 | 10/1969 | Duff | 210/519 X |
| 3,731,811 | 5/1973 | Gustavsson | 210/519 X |
| 3,794,167 | 2/1974 | Olgard et al. | 210/519 X |
| 3,886,064 | 5/1975 | Kosonen | 210/519 X |
| 3,929,640 | 12/1975 | Dohnert | 210/519 X |

FOREIGN PATENT DOCUMENTS 74447  8/1917  Switzerland .................. 210/521

*Primary Examiner*—Richard L. Chiesa
*Attorney, Agent, or Firm*—Smyth, Pavitt, Siegemund, Jones & Martella

[57] ABSTRACT

Devices to remove polluting components from waste liquids are usually designed to operate satisfactorily as long as the input flow rate remains less than some maximum allowed value. Greater flow rates will cause inadequate purification and resulting downstream pollution, as well as possible damage to the device. An emergency overflow weir may be provided to divert excessive input flow into a buffer vessel or alternative discharge channel. The weir will divert a part of the excess flow, but the remainder will pass through the device; the relative portions depend on the relative flow resistance of the weir and of the device, respectively. The present invention enhances the flow resistance of the device when the flow rate through it is greater than the maximum allowed value, so that a greater fraction of the excess flow will be diverted by the emergency overflow weir.

18 Claims, 26 Drawing Figures

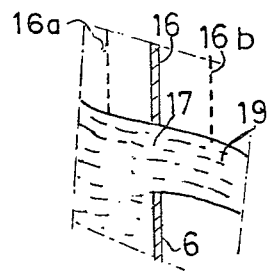
FIG. 9
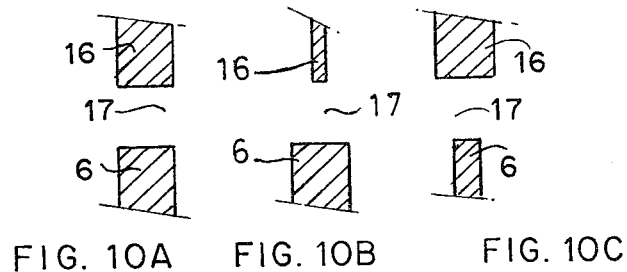
FIG. 10A   FIG. 10B   FIG. 10C
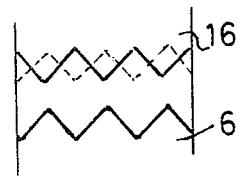
FIG. 11
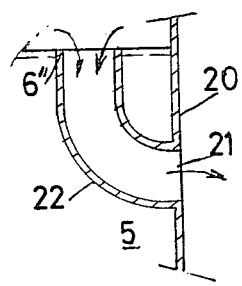 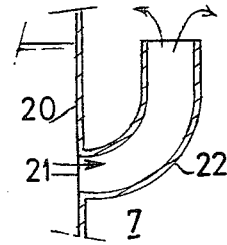
FIG. 12A   FIG. 12B
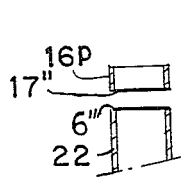 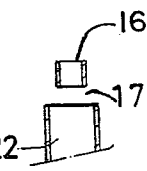 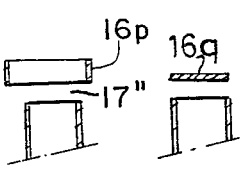 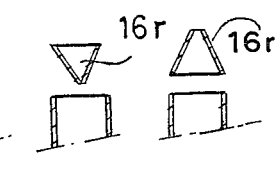
FIG. 13A   FIG. 13B   FIG. 13C   FIG. 13D   FIG. 13E   FIG. 13F
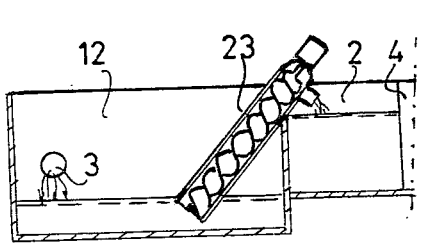 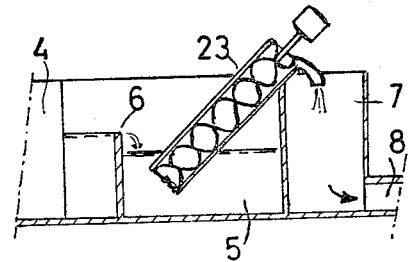
FIG. 14   FIG. 15

PURIFICATION DEVICE

BACKGROUND OF THE INVENTION

In many branches of industry polluting waste liquids are produced which cannot be drained as such in a sewer or watercourse, and generally it is to be avoided that this waste reaches the groundwater. Before being drained the waste liquid should, therefore, be stripped of noxious components as well as possible, e.g. by sedimentation or flotation, if necessary with addition of separation promoting agents, by biological purification, and the like.

For this purpose different kinds of purification devices are known which, in general, operate in such a manner that the purification effect is better as the residence time in such a device is longer.

It can happen, however, that the liquid supply increases in such a manner that the purification device is not able to operate in the required way, e.g. when, because of a failure in a duct or container, heavy rains or the influx of extinguishing water in case of fire, an excessive supply occurs which cannot be processed in the required way by the purification device.

Such an excessive supply can be many times the normal liquid flow rate, but the probability of its occurrence is very low. It is, therefore, not justified to design the purification device for such an excessive flow rate, but nevertheless provisions should be made for preventing a substantial pollution by the drained liquid in the occurence of such an exceptional condition. In some cases it is possible that at such an excessive supply the degree of dilution of the impurities increases so that, as such, a direct draining in the normal discharge means would not be objectionable, but, in that case, the purification device would be disturbed by the strong flow, e.g. in the case of biological purification when the danger exists that the active silt is entrained by the strong liquid flow, and then the purification device will become inoperative, and its recovery will require some time after the normal conditions have been restored again.

The usual purification devices having an inlet and an outlet and intermediate means for effecting the separation of impurities from a liquid are, therefore, often provided with an emergency outlet which is able to divert, in such circumstances, a very considerable part of the excess supply either towards a buffer vessel or directly towards a normal discharge duct, and in the former case the contents of the buffer vessel can be subjected to a purification treatment again after the emergency situation has ended. Such an emergency outlet can communicate, by means of an emergency overflow weir, with the inlet end of the purification device, which overflow weir is so much higher than the normal liquid level as corresponds to a level rise as a consequence of the excess supply.

Now the flow resistance of an overflow weir is mainly determined by the border friction and similar boundary effects, so that, as the thickness of the overflowing liquid layer increases, this resistance will increase gradually at a lower rate, which has the consequence that, at an increasing flow rate, the level rise will become smaller. As the length of the overflow weir is larger, the smaller will be the level rise as a consequence of an increasing supply, so that at an increasing length of the weir its characteristic curve will become flatter. Thus for obtaining a favourable emergency discharge a large length of the emergency overflow weir will be required in order to limit the level rise at an excessive supply, since a level rise will also lead to an increasing flow rate through the purification device which should even be avoided.

Generally an overflow weir is present at the outlet end of a purification device determining the liquid level in this device. When a separated impurity will float on the liquid, it is desired to keep the liquid level as constant as possible so as to ensure, under all circumstances, a good discharge of the floating layer by means of an open collecting trough or the like without mixing the carrier liquid, so that it is desired to use an outlet overflow weir with a relatively flat flow characteristic, or at least to operate in a relatively flat part of its characteristic. However this is unfavorable in the said emergency cases, since, as a consequence of this flat characteristic of the outlet overflow weir, a considerable increase of the flow rate will already take place at a relatively small level rise, unless the length of the emergency overflow weir would be made very large.

A draw-back of a large length of the emergency overflow weir is that such a weir requires much space and material which will lead to considerably higher cost, and, as said before, the probability that such an emergency overflow weir will have to—become operative, is relatively small.

SUMMARY

The invention provides a device of this kind which is constructed in such a manner that, at an excessive supply rate, the separation means will not or not substantially be overloaded, to which end this device, apart from a buffer vessel or another emergency outlet, is provided with means for limiting the liquid supply towards the separation means to about the normal flow rate.

This can be obtained, according to the invention, in a number of ways, such as by including means in the normal flow path having a flow resistance which considerably increases as the flow rate therethrough increases, or by using means such as pumps which are designed to maintain a substantially constant liquid flow rate through the separation means. The former means comprise, for instance, rather narrow and/or long tubes or specially designed overflow weirs, and can be arranged at the inlet or outlet end or in an intermediate part of the device.

Such special weirs comprise in particular a normal overflow weir and an auxiliary weir having a lower edge which is parallel to the upper edge of the former weir and being situated at a given distance therefrom so that this lower edge corresponds to the normally maximum level in the device. Such a composite weir has the characteristic that, as soon as the liquid reaches the lower edge of the auxiliary weir, the flow resistance suddenly increases. Ordinary tubes, on the other hand, show a gradual increase of the flow resistance. In both cases, however, the increasing flow resistance will cause a level rise so that the greater part of the excess liquid supply will flow off via the emergency outlet rather than through the separation means so that the latter will not be substantially overloaded.

DETAILED DESCRIPTION OF THE PREFERRED EMBODIMENT

Figure 1:
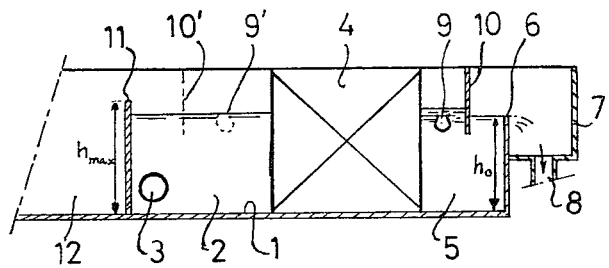
Figure 3:
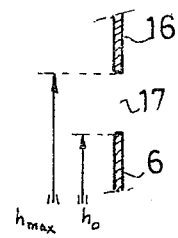
Figure 2:
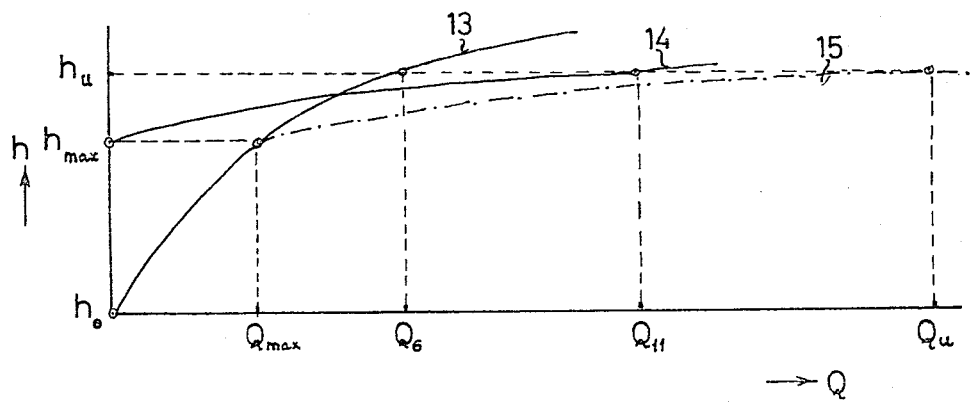
Figure 4:
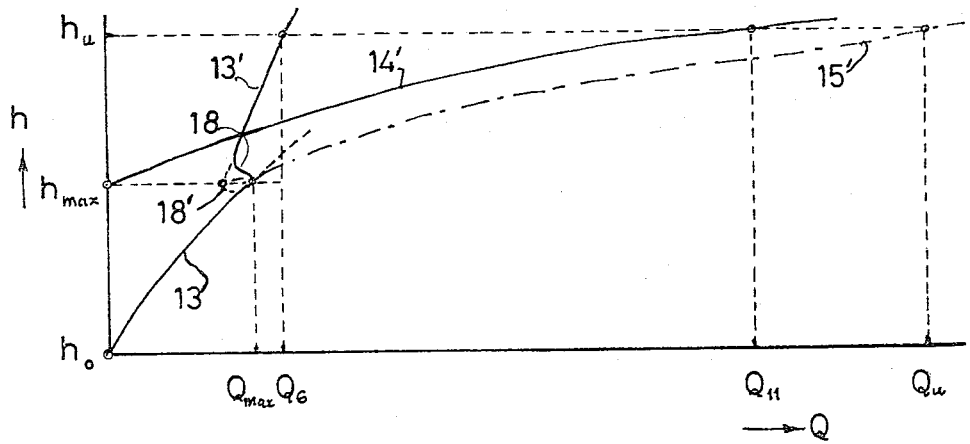
Figure 5:
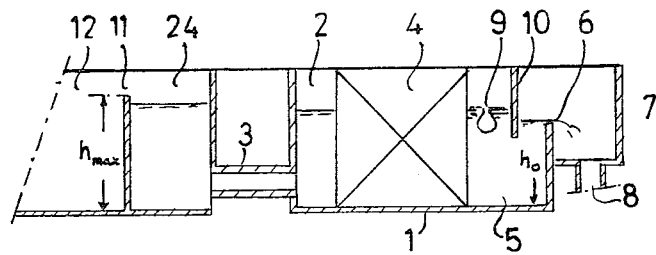
Figure 6:
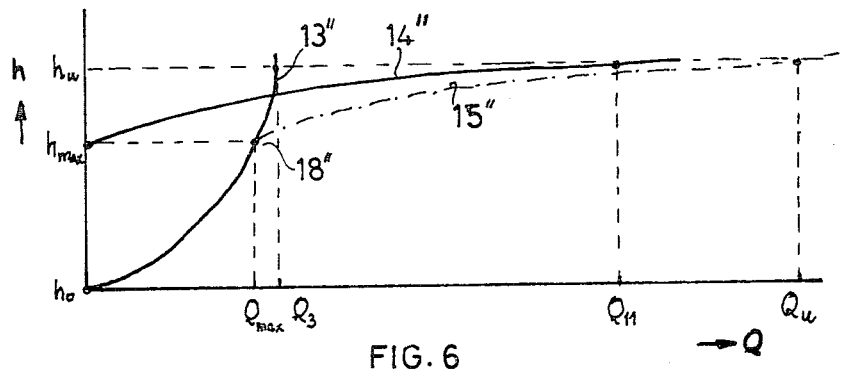
Figure 7:
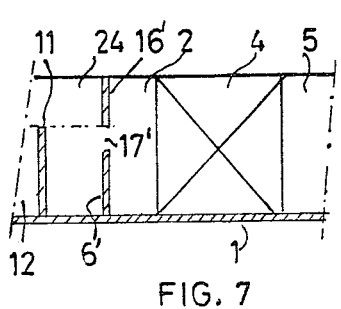
Figure 8:
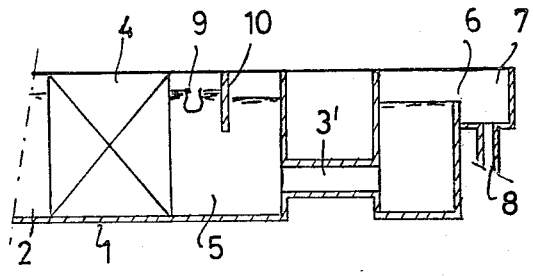
Figure 16:
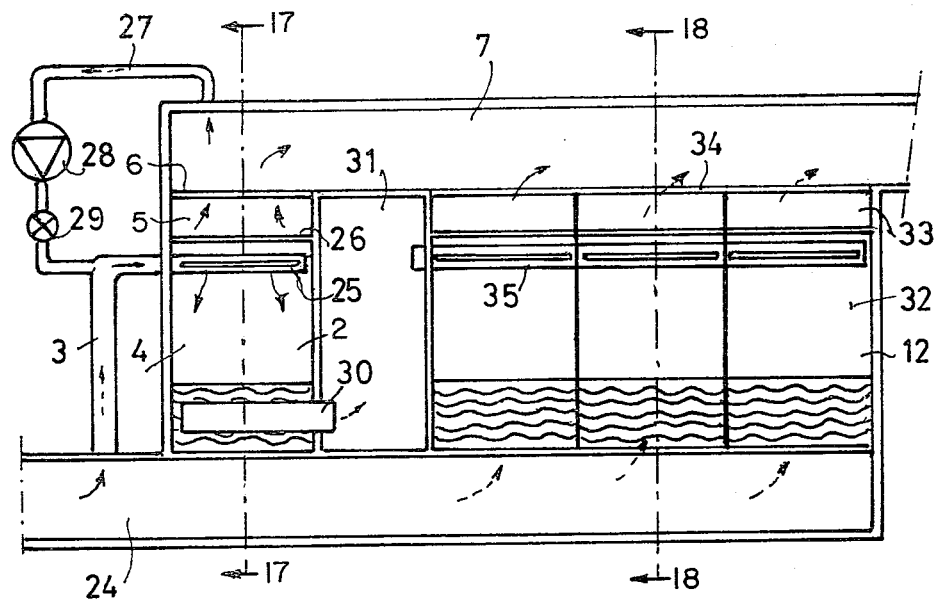

The invention will now be elucidated by reference to a drawing, showing in:

FIG. 1 a highly simplified section of a purification device according to the invention;

FIG. 2 a graph of the relationship between the liquid discharge flow over an overflow weir and the liquid level for two different overflow weirs of this device;

FIG. 3 a schematic section of a special overflow weir according to the invention;

FIG. 4 a graph corresponding to FIG. 2 of the operation when using the overflow weir of FIG. 3;

FIG. 5 a section corresponding to FIG. 1 of another embodiment of the device according to the invention;

FIG. 6 a graph corresponding to FIG. 4 of the operation of the device of FIG. 5;

FIGS. 7 and 8 modifications of the devices of FIGS. 1 and 5 resp.;

FIG. 9 a schematic representation of the liquid flow through the special weir of FIG. 3;

FIGS. 10A through 10C schematic sections of modifications of the weir of FIG. 3;

FIG. 11 a schematic view of a modification of the weir of FIG. 3;

FIGS. 12A and 12B schematic sections of a special modification of the overflow weir of the invention;

FIGS. 13A through 13F further special modifications of the overflow weir of the invention;

FIGS. 14 and 15 schematic sections of still another embodiment of the device of the invention;

FIG. 16 a top view of a practical embodiment of the device of FIG. 5; and

Figure 17:
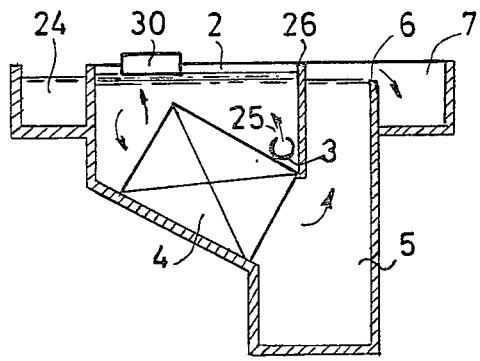
Figure 18:
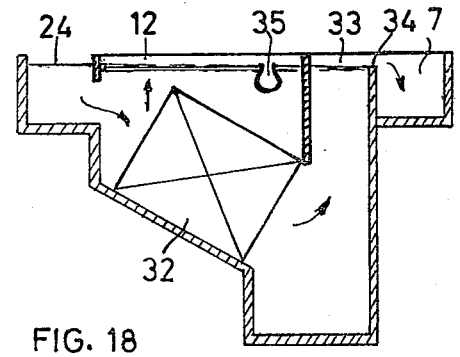

FIGS. 17 and 18 sections on the lines 17—17 and 18—18 resp. of FIG. 16.

In FIG. 1 a purification device according to the invention is shown in an extremely simplified manner. This device comprises a purification vessel 1 with an inlet chamber 2 to which the liquid to be treated, generally polluted waste water, can be supplied by means of a supply duct 3. A separator 4, by means of which the impurities can be separated from the carrier liquid, communicates with the chamber 2. Examples of such separators are sedimentation and/or flotation basins or plate separators, the latter preferably with inclined and in particular corrugated plates, or finally means for effecting a biological purification. Such separators have the property that the separation effect decreases as the flow rate therethrough increases, so that the device should be designed for a given maximum supply rate, and on exceeding this maximum the separation effect will deteriorate. The kind of separators used is of no importance for the present problem, and will therefore not be indicated in detail.

At the outlet end of the separator 4 an outlet chamber 5 is provided which connects, by means of an overflow weir 6, to a discharge channel 7 communicating with a sewer 8 or a duct leading to a water-course or a waste pit. For the sake of simplicity the chambers 2 and 5 are shown at the same level, but this is not necessarily always the case.

In the outlet chamber 5 a collecting trough 9 for removing separated components floating on the liquid is shown, and a dip baffle 10 ensures that the floating components do not flow off into the discharge channel 7. The trough 9 can also be arranged in the inlet chamber 2, as shown at 9′, in which case a dip baffle 10′ can be provided in this chamber again. This will depend on the manner in which the separator 4 operates.

The inlet chamber 2 communicates, by the intermediary of an emergency overflow weir 11, with a buffer vessel 12, so that in case of an excessive supply rate and a corresponding rise of the liquid level in the chamber 2, the excess liquid can be removed. Under some circumstances it is not necessary to store the excess liquid in a buffer vessel, for instance in the case of such a dilution of the impurities in the excess liquid that the liquid can be directly drained in a sewer 8 or a similar discharge means.

FIG. 2 shows a graph of the relationship between the liquid flow rate Q over a weir and the liquid level height h. The curve 13 shows this relationship for the weir 6 having a height $h_o$. As a consequence of border friction and similar boundary effects the resistance will initially be such that the liquid level will rise rather sharply at an increase of the supply rate, but as the overflowing liquid layer grows thicker the friction will be reduced so that the level rise will be reduced accordingly. The maximum liquid flow rate which will flow over the weir 6 under normal conditions, which substantially corresponds to the maximum flow rate which can be processed in the separator 4 with the desired separation effect, is indicated by $Q_{max}$. The corresponding liquid level is indicated by $h_{max}$. The weir 11 has, now, a height which is equal to or slightly larger than $h_{max}$, so that, on exceeding the maximum supply rate, the weir 11 will become operative. The weir 11 has a considerably larger length than the weir 6 so that the slope of the curve 14 of the former is much smaller than the slope of the curve 13. As the weir 11 becomes operative, the total discharge rate is the sum of the discharge rates over both weirs as indicated by the curve 15.

From FIG. 2 it clearly appears that, at an exceptionally high excessive supply rate $Q_u$, a considerable part $Q_{11}$ will flow off over the weir 11 and a correspondingly smaller part $Q_6$ over the weir 6, but the latter part $Q_6$ is still about two times larger than $Q_{max}$. This means that the separator will be considerably overloaded, and the separation effect will then be smaller accordingly. In the case of biological purification the considerably increased flow velocity will have the consequence that active silt will be entrained towards the outlet end so that the future separation effect will be considerably impaired. The ratio between $Q_{11}$ and $Q_6$ can be improved by making the curve 14 still flatter, i.e. by increasing the length of the weir 11, but this will require much space, even if this weir is assembled from partial weirs arranged in a comb or saw-tooth fashion. A certain improvement can be obtained by giving a steeper characteristic to the weir 6, but this will lead to considerable level fluctuations during the normal operation which is undesirable, especially when floating components are to be removed by means of a trough 9 or 9′ without entraining carrier liquid.

In order to avoid this draw-back an overflow weir according to FIG. 3 may be used, comprising, apart from the normal weir 6, an inverted extension weir 16 positioned above the former one, and between both an aperture 17 is defined, the lower edge of the upper weir 16 being situated at the level $h_{max}$. During the normal operation of the device this assembly operates in the same manner as the single weir 6 of FIG. 1. However, as soon as the level $h_{max}$ has been reached, the liquid will contact the lower edge of the upper weir 16, and the flow resistance against this edge and other boundary effects will then influence the flow.

FIG. 4 shows the effect of such an additional weir on the operation of the device. Until the level $h_{max}$ has been reached, the relationship between Q and h is given by the same curve 13 as in FIG. 2. On reaching the lower edge of the weir 16, however, the flow resistance increases so that the level will rise more sharply accordingly, and, moreover, the liquid discharge flow rate will decrease as shown at 18. At a further level rise the discharge flow rate will increase but now according to a much steeper curve 13′. At the same time the weir 11 has become operative which occurs rather abruptly as a consequence of the abrupt level rise. The latter weir will, thus, be able to absorb the growing liquid supply very quickly. The sum of the flows over both weirs is, again, represented by the curve 15′. The curve 14′ of the weir 11 is, in this case, steeper than the curve 14 of FIG. 2, which indicates that the length of the weir 11 is smaller than in the case of FIG. 1. Nevertheless, at the same exceptional supply flow rate $Q_u$, the discharge flow rate $Q_{11}$ over the weir 11 will be substantially equal to the liquid flow rate increase, since $Q_6$ is hardly larger than $Q_{max}$. According as the curve 13′ is steeper, the difference between $Q_6$ and $Q_{max}$ will be smaller. In this manner an effective protection of the separator 4 against overloading can be obtained with a rather short emergency overflow weir 11.

When the liquid supply decreases again, the liquid flow rate over the weirs 6 and 11 will be reduced along the curves 13′ and 14′ resp. The flow over the weir 6 decreases along the curve 13′ until the level $h_{max}$ is reached. At a further reduction of the supply rate the working point will change more or less abruptly towards the curve 13 as indicated at 18′. The curve shape at a rising level is, therefore, different from that at a falling level. This hysteresis depends on the structure of the device, in particular on the slope of the curve 13′, and can be much smaller than shown in FIG. 4.

It will be clear that, in this manner, a normal operation with relatively small level fluctuations can be combined with a very favourable ratio between the discharge flows over both weirs.

FIG. 5 shows another embodiment of the purification device of FIG. 1 in which the same reference numerals are used for indicating similar parts.

This embodiment differs from the former one in that the duct 3 is a tube with a given length which forms a connnection between the inlet chamber 2 and a supply channel 24 which, on the other hand, communicates by means of an emergency overflow weir 11 with a buffer vessel 12 which, at an excessive supply rate, can absorb the excess liquid flowing over the weir 11.

FIG. 6 shows a graph of the operation of this device, the curve 13″ giving the relationship between the liquid level in the channel 24 and the liquid flow rate in the duct 3, and the curve 14″ representing the relationship between the liquid flow over the weir 11 and the liquid level. The flow resistance of the tube 3 increases as the flow rate increases which leads to a corresponding level rise in the channel 24 in respect of the level in the vessel 1 determined by the outflow weir 6. When in the point 18″ the level $h_{max}$, which corresponds to the height of the overflow weir 11 and is the highest level normally occurring, has been reached, the liquid will flow off over the latter weir at a further increase. The point 18″ lies on a steep part of the curve 13″ so that the flow rate increase in the duct 3 at a given level rise will be low.

The curve 15″ represents, again, the sum of the flow rates according to the curves 13″ and 14″. An exceptionally large liquid flow rate $Q_u$ corresponds to a level $h_u$, and then a flow rate $Q_{11}$ will flow over the weir 11 and a flow rate $Q_3$ through the tube 3, the latter then being only a little higher than $Q_{max}$ so that the separator 4 will only slightly be overloaded.

This operation mainly corresponds to that according to FIG. 4, but differs therefrom in that the curve 13′ is steeper than the curve 13 of FIG. 2 so that during the normal operation the level fluctuations in the channel 24 will be larger, but this is not objectionable since such fluctuations are only to be avoided in those parts where floating components are to be removed. Another difference is that the transition is less sharp. The solution of FIG. 5 is, therefore, very suitable for using at the inlet side of the purification device.

If, however, a sharper transition is desired, it is also possible, as shown in FIG. 7, to use between the channel 24 and the chamber 2 instead of the tube 3 a weir 6′ having a height $h_o$ and an auxiliary weir 16′ between which an opening 17′ is defined as in the case of FIG. 3. The operation of such an assembly is the same as shown in FIG. 4.

FIG. 8 shows another embodiment corresponding to that of FIG. 5, but now the outlet chamber 5 is connected by means of a tube 3′ with the discharge channel 7. This will, however, lead to level fluctuations in the vessel 1, so that this solution will only be used when such fluctuations are not objectionable.

FIG. 9 shows a liquid flow 19 through the opening 17 between the weirs 6 and 16 of FIG. 3. The liquid is driven upwards before these weirs, and flows through the opening 17 with a certain height drop. It will be clear that the location of the auxiliary weir 16 is of importance for the effect obtained. When transversely shifting the weir 16, the height of the lower edge is to be chosen accordingly, as shown at 16a and 16b. An adjustment of the operation can be obtained by moving the weir 16 vertically and/or horizontally.

It will be clear that, instead of both weirs 6 and 16, also a plate can be used in which one or more corresponding apertures are provided.

The effect of these weirs depends, moreover, on their thickness. When increasing the thickness, the contact area with the liquid flow is increased, and, thus, the friction resistance. FIGS. 10A, B and C show three possible examples of thicker weirs, and the thicknesses of the weirs 6 and 16 can be equal or different, depending on the desired effect on the flow. Such weirs can, of course, be mutually movable for obtaining an adjustment.

FIG. 11 shows another embodiment in which the weirs 6 and 16 are toothed, enabling to influence the flow resistance variation. The teeth can be arranged in phase or phase opposition, and it is also possible to vary the phase relationship by longitudinally shifting the weirs. Instead of the saw-tooth shape also a rectangular toothing or a corrugation can be used.

FIG. 12 shows another embodiment which is an intermediary solution between those of FIGS. 1 and 7, on the one hand, and 5 and 8 on the other hand. Instead of the overflow weir 6 or 6′ a closed baffle 20 with holes 21 is provided, in which holes curved tubes 22 are fixed, having an upper rim 6″ at the same height as the upper edge of the weir 6 or 6′.

In the case of FIG. 12A the tubes 22 are situated, for instance, in the outlet chamber 5. The liquid flows over the rims 6" of the tubes 22, and the effect is substantially the same as in the case of the weir 6 of FIG. 1. However, as soon as a given flow rate is exceeded, substantial turbulences and vortices will occur in the liquid which lead to a considerable increase of the flow resistance, and then the effect described in respect of FIG. 4 will occur. Moreover the wall friction in the tube will cause a certain flow resistance depending on the flow velocity. In the case of FIG. 12B the tubes 22 are situated, for instance, in the discharge channel 7, and then the effect of turbulences and vortices is somewhat smaller.

FIG. 13 shows additional means for influencing the flow resistance in the tubes of FIG. 12. Above the extremity 6" of the tubes 22 auxiliary parts are provided in the shape of tube sections 16p with the same or a different diameter as the tubes 22, or a plane 16q or a closed or open conical part 16r, a passage 17" remaining free between the tube and the auxiliary part in question. It will be clear that still other shapes of these auxiliary parts are possible, and that the tubes 22 can also be arranged between the duct 24 and the inlet chamber 2.

In FIGS. 14 and 15 a different solution of the present problem is shown. In FIG. 14 the supply duct 3 opens in the buffer vessel 12, which is connected to the inlet chamber 2 by means of a pump 23, e.g., as shown, a screw pump. The outlet of this pump is higher than the highest level in the vessel 12. At a given driving speed the pump has a fixed maximum yield independent of the level in the vessel 12. If the supply becomes excessive, the level in the vessel 12 will rise, but the quantity of liquid transferred towards the vessel 1 remains unchanged, which quantity is adapted to the capacity of the separator 4 so that the latter will never be overloaded. If necessary the vessel 12 can be connected to a larger buffer vessel by means of an emergency overflow weir.

In case of FIG. 15 the pump 23 is arranged at the outlet end instead of at the inlet end, and the fixed pump yield is, again, adapted to the normal liquid supply rate. When the supply rate increases, the discharge rate remains unchanged, so that the level in the vessel 1 will rise but the flow rate through the separator 1 is determined by the flow through the pump 23 so that such a level rise has no influence on the separation effect. When an emergency overflow weir is present, the excess liquid will be discharged over that weir as soon as the level over that weir is exceeded.

In FIGS. 16-18 a practical example of a device according to FIG. 5 is shown. The normal separator 4 is, in this case, a plate separator, which, in the first place, serves to separate floating components. The tube 3 is branched from the supply channel 24, and opens in that part of the inlet chamber 2 which is situated above the separator 4, and is, there, provided with one or more injection nozzles 25. A baffle 26 separates the chamber 2 from the outlet chamber 5 which connects via an overflow weir 6 with the discharge duct 7. A suction duct 27 connects with the channel 7 and is provided with a compression pump 28 which can suck in air, and the pressure side of this pump is connected by means of a pressure reduction valve 29 to the injection part of the duct 3. In this manner a pressurized mixture of purified liquid and air can be injected together with the liquid to be purified, the air forming, after decompression in the valve 29, air bubbles which will entrain above the nozzle 25 easily separable particles towards the liquid surface. Subsequently the liquid flows through the separator 4 in which the remaining separable particles are separated. The purified liquid flows, then, towards the channel 7, and a scraper 30 removes the floating components towards a collecting basin 31.

A basin 12 is connected to the channel 24, and a number of plate separators 32 is arranged therein. The separators 32 are designed for purifying large quantities of liquid in which the purification can be less critical than in the case of the normal liquid supply, and is just sufficient for preventing serious pollution. The outlet chambers 33 of these separators are connected to the channel 7 by means of an overflow weir 34. This weir is so high that, at the normal liquid supply rate, the liquid level remains below the edge thereof, so that, then, the separators 32 are inoperative. As soon as the supply rate considerably increases, the level will rise by the resistance in the duct 3 in such a manner that the liquid flows over the weir 34, and the separator 4 will be hardly overloaded. For the rest the weir 34 can also be provided at the inlet side of the separators 32.

The additional separators 32 can also be constructed as a common emergency outlet for several independent separators 4, and can also be used with the other embodiments according to the preceding Figures.

It will be clear that, when the normal separator 4 according to any one of the preceding Figures consists of a series connection of two or more separators, the means for limiting the liquid flow through these separators can also be arranged between two separators of such a series connection instead of at the inlet or outlet end. Although, in the preceding examples, always floating components have been mentioned, it will be clear that the devices in question can also be used in the case of sedimentating components. Since, then, possibly occuring substantial level fluctuations at the outlet for the separated components are not objectionable, the embodiments in which such fluctuations may occur are particularly suitable for the purpose.

Since the probability of a very excessive supply flow is, in general, very small, a number of purification devices can be connected in common to one buffer vessel or another emergency outlet. By using the invention considerable space and cost savings are possible, without detracting from the safety requirements.

I claim:

1. A purification device protected against excessive input flow of a liquid bearing an impurity, comprising:
a buffer basin;
a supply channel having an emergency discharge weir for discharging liquid into said buffer basin when the level of the liquid in the supply channel exceeds a predetermined value $h_{MAX}$;
a separator communicating with said supply channel for receiving liquid from it to be purified by said separator;
a discharge channel for receiving the liquid after it has been purified by the separator; and,
flow rate limiting means communicating in series with the separator between the supply channel and the discharge channel and having a substantially greater flow resistance for flow rates exceeding a predetermined value $Q_{MAX}$, related to $h_{MAX}$, than for lesser flow rates;
whereby, when the flow through the separator equals or exceeds $Q_{MAX}$, any further increase of liquid in said supply channel will be deterred by the increased flow resistance from flowing through the separator and will therefore tend to increase the level of liquid in the supply channel causing an increase in flow over said emergency discharge weir.

2. The purification device of claim 1 wherein said flow rate limiting means further comprises a flow resistance element.

3. The purification device of claim 2 wherein said flow resistance element further comprises an inverted weir having a lower horizontal edge at a height substantially equal to the height $h_{MAX}$ of the emergency overflow weir of the supply channel.

4. The purification device of claim 3 wherein said inverted weir has appreciable thickness in the direction of flow.

5. The purification device of claim 2 wherein said flow resistance element further comprises a plate oriented normal to the flow direction and having an aperture defined in part by two parallel elongated horizontal edges, the height of the upper edge substantially equal to the height of $h_{MAX}$ of the emergency overflow weir of the supply channel.

6. The purification device of claim 2 wherein said flow resistance element further comprises a tube, both ends of which are normally submerged beneath the surface of the liquid.

7. The purification device of claim 2 wherein said flow resistance element further comprises a tube, one end of which lies in a horizontal plane located at a level less than $h_{MAX}$ and the other end of which is always submerged beneath the surface of the liquid.

8. The purification device of claim 1 wherein said flow rate limiting means further comprises a device in which applied energy is used to maintain the rate of flow through said flow rate limiting means at a value not exceeding $Q_{MAX}$.

9. The purification device of claim 8 wherein said flow rate limiting means is a constant volume pump.

10. In a purification device of the type wherein an impurity-bearing liquid in a supply channel passes through a separator which substantially separates the impurities from the liquid, the purified liquid being discharged from the separator into a discharge channel, the supply channel being provided with an emergency overflow weir for discharging excess incoming impurity-bearing liquid into a buffer basin when the level of liquid in the supply channel exceeds a predetermined value $h_{MAX}$, the improvement comprising:

flow rate limiting means connected in series with the separator between the supply channel and the discharge channel and having a substantially greater flow resistance for flow rates exceeding a predetermined value $Q_{MAX}$, related to $h_{MAX}$, than for lesser flow rates, whereby when the flow through the separator equals or exceeds $Q_{MAX}$, any further increase of impurity-bearing liquid in the supply channel will be deterred by the increased flow resistance from flowing through the separator and will therefore tend to increase the level of liquid in the supply channel causing an increase in flow over the emerging overflow weir.

11. The improvement of claim 10 wherein said flow rate limiting means further comprises a flow resistance element.

12. The improvement of claim 11 wherein said flow resistance element further comprises an inverted weir having a lower horizontal edge at a height substantially equal to the height $h_{MAX}$ of the emergency overflow weir of the supply channel.

13. The improvement of claim 12 wherein said inverted weir has appreciable thickness in the direction of flow.

14. The improvement of claim 11 wherein said flow resistance element further comprises a plate oriented normal to the flow direction and having an aperture defined in part by two parallel elongated horizontal edges, the height of the upper edge substantially equal to the height $h_{MAX}$ of the emergency overflow weir of the supply channel.

15. The improvement of claim 11 wherein said flow resistance element further comprises a tube, both ends of which are normally submerged beneath the surface of the liquid.

16. The improvement of claim 11 wherein said flow resistance element further comprises a tube, one end of which lies in a horizontal plane located at a level less than $h_{MAX}$ and the other end of which is always submerged beneath the surface of the liquid.

17. The improvement of claim 10 wherein said flow rate limiting means further comprises a device in which applied energy is used to maintain the rate of flow through said flow rate limiting means at a value not exceeding $Q_{MAX}$.

18. The improvement of claim 17 wherein said flow rate limiting means is a constant volume pump.

* * * * *